No. 727,143. PATENTED MAY 5, 1903.
T. B. JEFFERY.
REVERSING AND SPEED REDUCING MECHANISM.
APPLICATION FILED NOV. 23, 1900.
NO MODEL. 3 SHEETS—SHEET 1.

Witnesses.
Edward T. Wray.
Edgar L. Conant.

Inventor.
Thomas B. Jeffery
by Burton Burton
his Atty's.

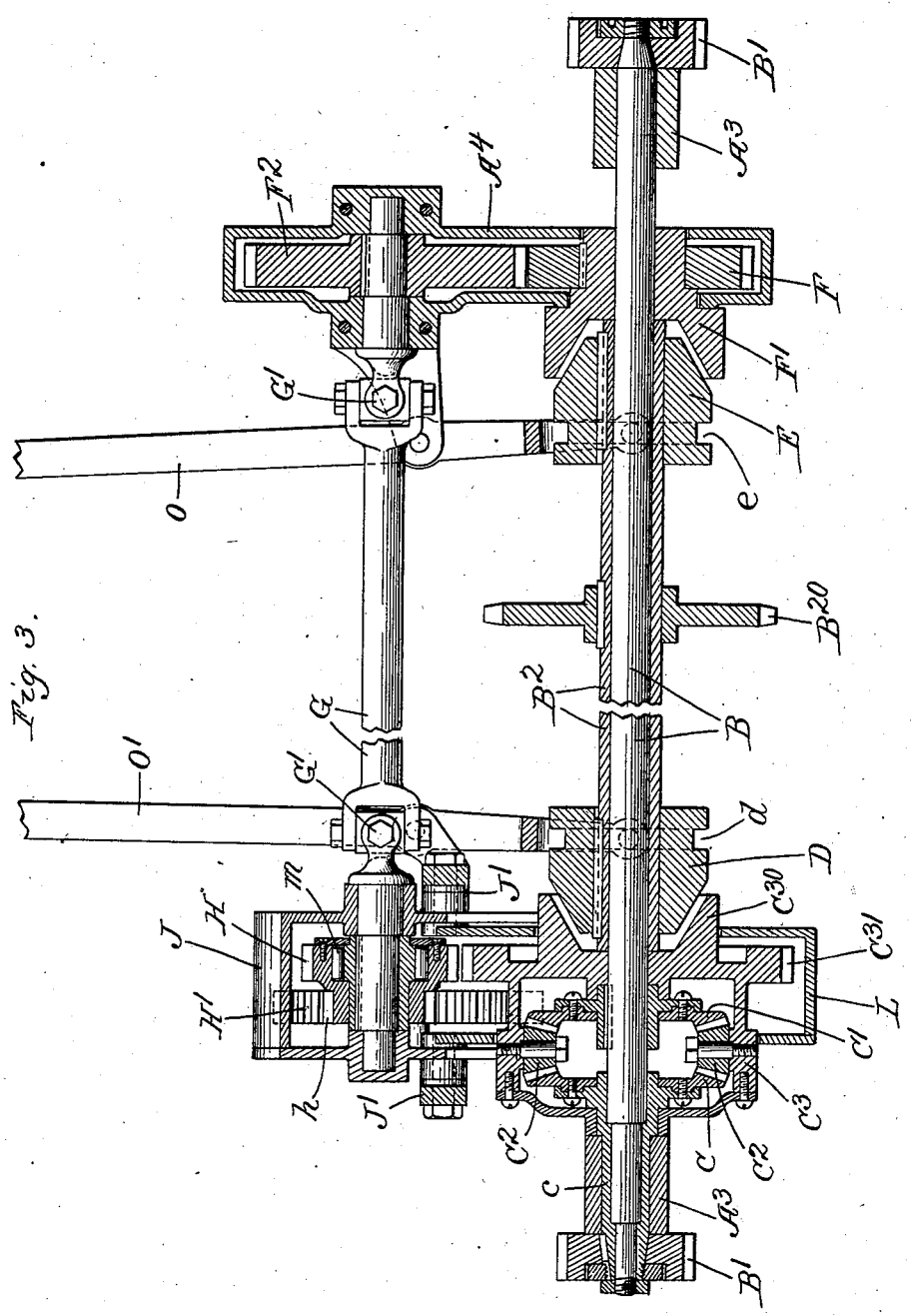

No. 727,143. PATENTED MAY 5, 1903.
T. B. JEFFERY.
REVERSING AND SPEED REDUCING MECHANISM.
APPLICATION FILED NOV. 23, 1900.
NO MODEL. 3 SHEETS—SHEET 3.

No. 727,143. Patented May 5, 1903.

UNITED STATES PATENT OFFICE.

THOMAS B. JEFFERY, OF CHICAGO, ILLINOIS.

REVERSING AND SPEED-REDUCING MECHANISM.

SPECIFICATION forming part of Letters Patent No. 727,143, dated May 5, 1903.

Application filed November 23, 1900. Serial No. 37,431. (No model.)

*To all whom it may concern:*

Be it known that I, THOMAS B. JEFFERY, a citizen of the United States, residing at Chicago, in the county of Cook and State of Illinois, have invented certain new and useful Improvements in Reversing and Speed-Reducing Mechanism for Motor-Vehicle-Driving Trains, of which the following is a specification, reference being had to the accompanying drawings, forming a part thereof.

This invention relates to reversing and speed-reducing devices in the gear-train of a motor-actuated vehicle.

It consists of features of construction which are set out in the claims.

Figure 2:
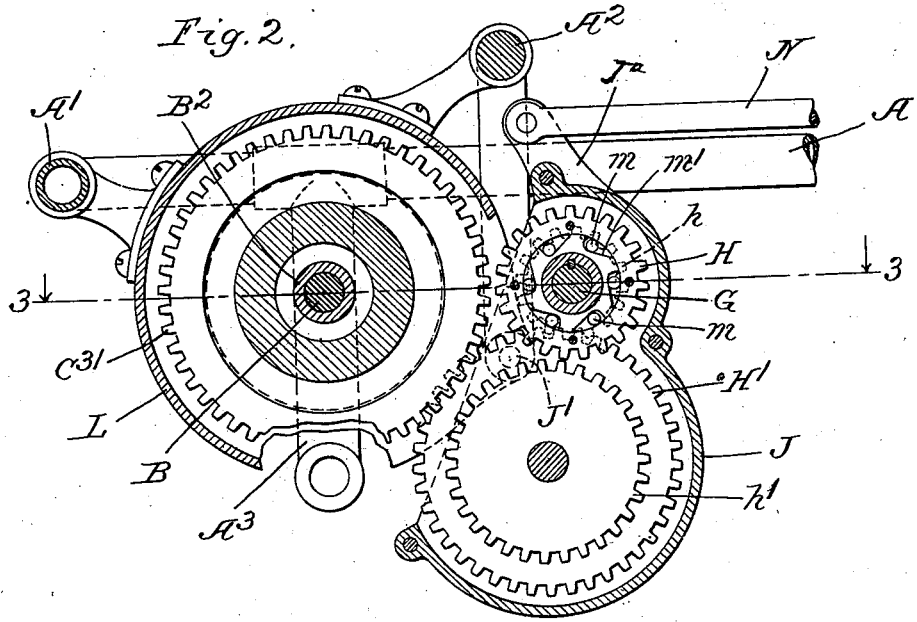
Figure 1:
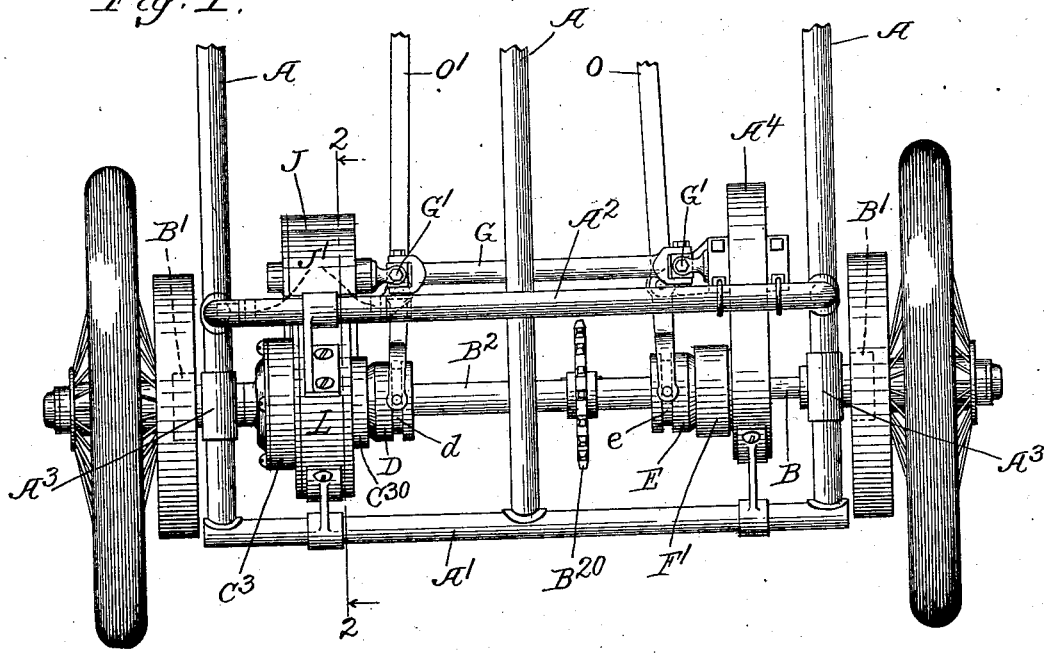
Figure 4:
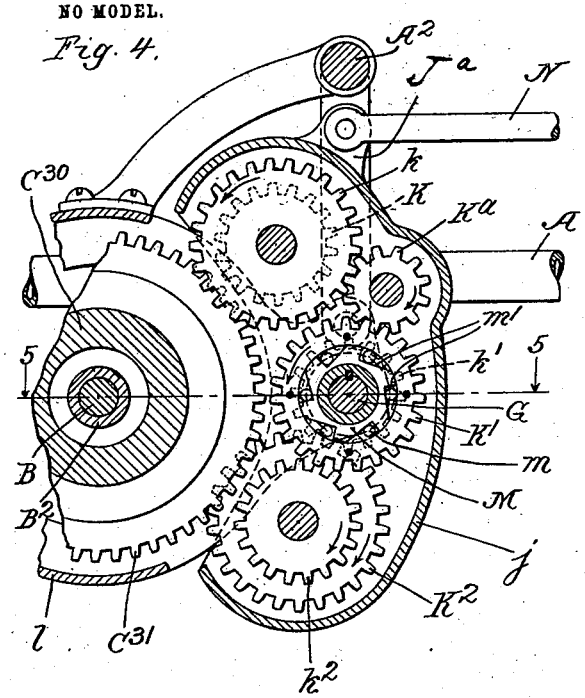
Figure 5:
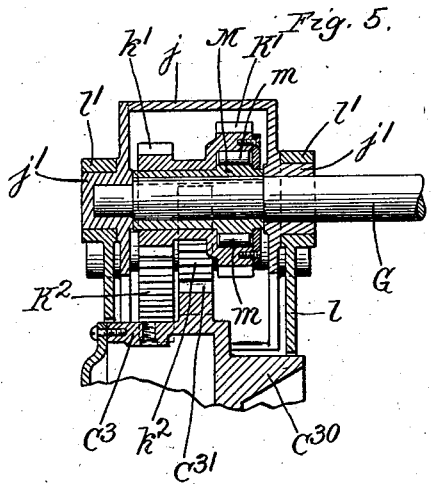
Figure 6:
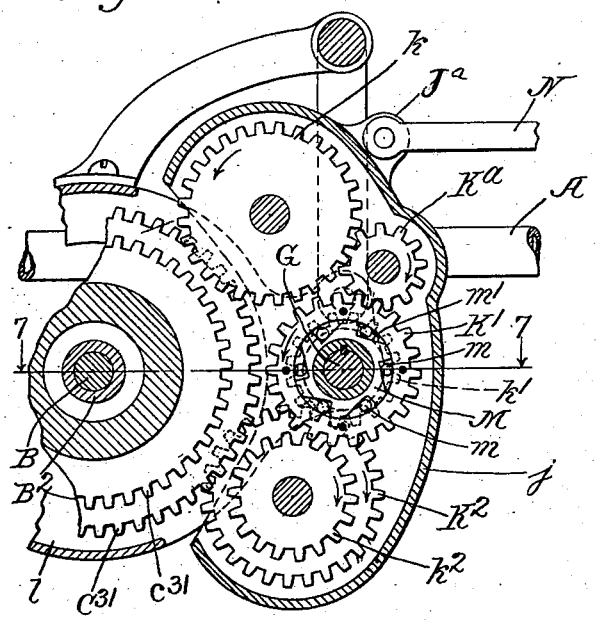
Figure 7:
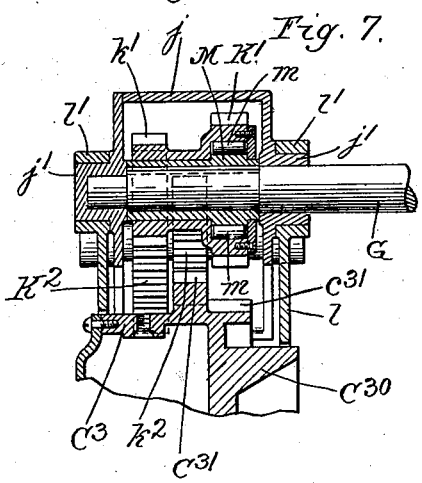

In the drawings, Figure 1 is a plan of a portion of the running-gear frame of a motor-vehicle having my improvement in the train. Fig. 2 is a fore-and-aft section at the line 2 2 on Fig. 1. Fig. 3 is a horizontal section at the line 3 3 on Fig. 2. Fig. 4 is a view similar to Fig. 2, showing a modification. Fig. 5 is a section at the line 5 5 on Fig. 4. Fig. 6 is a view similar to Fig. 4, showing a modification based on the form shown in said Fig. 4. Fig. 7 is a section at the line 7 7 on Fig. 6.

My improved devices relating to speed-reducing and reversing I have shown embodied in a structure which as to other details is shown and fully described in the pending application of Robert W. Thompson and myself, which was filed in the United States Patent Office on the 27th day of October, 1900, Serial No. 34,544. This mechanism will now be described so far as necessary for the understanding of the particular improvement to which this application relates. It comprises any form of running-gear frame suitable to support the mechanism and be supported by the traction-wheels. In the drawings such running-gear frame is represented by the bars A A A, extending longitudinally, the cross-bars A' and $A^2$, and the short vertical reaches $A^3$ $A^3$, &c., which connect them and afford immediate support for the bearings of the traction-wheels and the traction-wheel driving-shaft.

B is the traction-wheel driving-shaft, having at opposite ends the pinions B' B', designed to mesh with any suitable gear-rim on the traction-wheels, respectively.

$B^2$ is a sleeve loose on the traction-wheel driving-shaft B and driven by the motor, power being communicated to it by a chain operated by the sprocket-wheel $B^{20}$, which is fast on said sleeve.

c is the sleeve-shaft of the outside gear of the compensating gear structure, which comprises the gear C, the gear C', opposed to it, rigid with the shaft B, intermediate pinions $C^2$ $C^2$, and the pinion-carrying element $C^3$, which is loose on the shaft B. The hub $C^{30}$ of the pinion-carrying element $C^3$ is conically hollowed and adapted to receive the cone D, which is feathered on the sleeve $B^2$, said two elements—the hub $C^{30}$ and the cone D—constituting a clutch by means of which the compensating gear device is engaged by the motor-actuated sleeve.

On the shaft B at the opposite end of the sleeve $B^2$ there is loosely journaled a gear F, having a conically-hollowed hub F', adapted to afford a seat for the cone E, similar to the cone D, which is feathered on the opposite end of the sleeve $B^2$, the two elements—the hub F' of the gear F and the cone E—constituting a clutch for the engagement of the motor-driven sleeve $B^2$ with the gear F.

G is a counter-shaft having at one end the gear $F^2$, meshing with and driven by the gear F, and at the other end one of the gears of the speed-reducing and reversing train to which my invention relates and which will be more particularly hereinafter described, said train constituting an operating connection from said counter-shaft to the pinion-carrying element of the compensating gear-train, said element $C^3$ having a peripheral gear-rim $C^{31}$ for this purpose.

It will be understood that when the cone D is engaged with the conical hub $C^{30}$ the shaft B is directly rotated at the speed which the sleeve $B^2$ receives from the motor and that when the cone E is engaged by the hub F' of the gear F the compensating gear element $C^3$ receives rotary motion at a reduced speed and in certain cases in the reverse direction, such motion being transmitted to the traction-wheel driving-shaft through the compensating gear-train precisely as when said element $C^3$ is engaged and driven directly by the cone D.

O and O' are levers fulcrumed on the running-gear frame and forked to engage the grooves $d$ and $e$ of the cones D and E, respectively, to shift said cones on the motor-driven sleeve into and out of engagement with the other elements of the clutches of which they respectively form parts.

My present invention, as above stated, relates to the structure of the speed-reducing and reversing train intermediate the counter-shaft G and the pinion-carrying element $C^3$ of the compensating gear-train. The pinion-carrying element $C^3$ of the compensating gear-train incloses the remainder of the train and is itself inclosed in a case L, suitably secured to the running-gear frame. To the arm $A^2$ of the running-gear frame and also to this case L, which virtually constitutes a continuation of the running-gear frame, being rigid with the latter, there is pivoted at $J'$ $J'$ a frame J, which is also a housing for the speed-reducing and reversing train, which is inclosed as well as journaled therein. I will first describe the train as shown in Fig. 2, wherein there is comprised an initial gear H, having rigid with it a smaller gear $h$, which meshes with a gear H', having rigid with it a smaller gear $h'$. The gear H and the smaller gear $h'$ are in such position on the pivoted or oscillating frame J that as said frame rocks about its pivotal connection to the frame L at one limit of such oscillation the gear H comes into mesh with the gear-rim $C^{31}$ of the pinion-carrying element $C^3$ of the compensating gear-train, while at the other limit of that oscillation the gear $h'$ comes into mesh with said gear-rim. It will be noticed that the several gears of this train are so related as to size that there is a reduction of speed from the gear H to the gear $h'$ and also that the gear $h'$ has a reverse direction of rotation from the gear H, so that as the frame J is rocked about its pivot from one limit to the other while the speed-reducing train mounted on said frame J is being actuated by connection of the counter-shaft G to the initial wheel H of said train both the direction and the speed of the rotary motion which the train communicates to the pinion-carrying element $C^3$ of the compensating gear-train are changed. When the gear H is in mesh, the direction of motion is such as to give forward travel to the train at a speed considerably lower than the speed which would be given by direct connection of said element $C^3$ with the motor-driven sleeve by means of the clutch-cone D engaging the rim $C^{30}$; but when the frame is rocked to throw the gear $h'$ into mesh with the gear-rim $C^{31}$ the direction of motion is such as to back the vehicle and the speed is much reduced below that communicated even by the gear H meshing with said gear-rim $C^{31}$. When this form of train is employed, since it involves the changing of position of the initial wheel H, it is necessary to make the counter-shaft G flexible to accommodate the different positions occupied by said initial wheel. For this purpose, preferably, said shaft G is constructed, as shown, with two universal joints or toggle-joints G' G', as illustrated, one near the bearing of said shaft on the running-gear frame which is obtained in the housing $A^4$ for the gears F and $F^2$, which is suitably secured to the running-gear frame, and the other being located near the frame J, in which said shaft has its other bearing. Any other form of flexible shaft may be employed between the two bearings.

A modified form of the speed-reducing and reversing train is shown in Figs. 4 and 5. In this train there are three pairs of gears rigid, two and two, on three shafts journaled in the frame, which is in this form denoted by the letter $j$, and an intermediate gear on a fourth shaft to reverse the direction of the extreme wheels. The extreme wheels of the train are adapted to mesh with the gear-rim $C^{31}$ at opposite limits of the oscillation of the frame; but in this form the initial gear-wheel of the train, the one directly connected with the counter-shaft, is the intermediate gear-wheel K', which has rigid with it a smaller gear $k'$. The gear K' meshes with reversing-gear $K^a$, which in turn meshes with the gear $k$, having rigid with it the gear K, the latter adapted to mesh with the gear-rim $C^{31}$. The gears K and $k^2$ being respectively extreme or opposite final wheels on the train, the former is adapted to communicate a rotary motion forward—that is, in the direction to propel the vehicle forward—at a moderate speed and the latter to communicate reverse motion at a reduced speed. It will be seen that in this construction, the motion of the reducing and reversing train originating with the intermediate wheel, it is possible to pivot the frame $j$ about the axis of that wheel, thus avoiding the necessity of making the counter-shaft G flexible. This modification is therefore shown with a rigid counter-shaft. The frame $j$ is in this form pivoted to the housing $l$, corresponding to the housing L employed in the other construction, suitable pivot-bosses $j'$ $j'$ and $l'$ $l'$ being provided on the housings $j$ and $l$, respectively, about the bearings of the counter-shaft. N is a link connected to the lever-arm $J^a$ of the frame J or $j$ and extended forward toward the position occupied by the driver or motorman, where it may be connected with any suitable operating means for oscillating the frame and changing the speed or direction of motion.

I prefer to interpose in the speed-reducing train at some convenient point a clutch device adapted to drive in one direction only, permitting the driven element to be driven more rapidly than the driving element will drive it and to be unactuated by the rotation of the driving element in the reverse direction. For one of the specific purposes for which such clutch is desirable it is most desirable to locate it in connection with the first wheel of the speed-reducing and reversing train—that is, the wheel immediately actuated by the counter-shaft—and I have so shown it in connection with the gears H and K', respectively, in the two forms of train above described. In each case it consists of an inner element M directly attached to the counter-shaft and driving the outer element—to wit, the gear H or the gear K'. The clutch devices, of familiar construction, consist of rollers $m$ $m$, riding in eccentric slots $m'$ in the central element M, so that rotation in one direction permits them to lie in the deepest part of the slot, permitting the two elements to rotate without regard to each other. One purpose of employing this device is the same as that mentioned in the above-mentioned application of Thompson and myself—to wit, that it may not be necessary first to disconnect the clutch which operates the speed-gearing train in order to give the lower speed before engaging the clutch which gives the higher speed; but a special purpose in the speed-reducing and reversing train which constitutes the present invention is to prevent the running of the entire speed-reducing train, including the wheels $F^2$ and F, if in any case the motorman should operate the reversing connection so as to throw the gear $h'$ or $k^2$ into mesh with the rim $C^{31}$, while the high speed is being maintained by the engagement of the cone D and clutch-rim $C^{30}$.

If preferred in any instance, the element $C^3$ may have two gear-rims $C^{31}$ and $c^{31}$ of different diameters, and the reduction of speed may be made to depend partly on this difference. I have shown this modification in Figs. 6 and 7, the form of train being in other respects that shown in Figs. 4 and 5, but no reduction of speed being made in transmitting motion from the gear K' to the smaller gear-rim $c^{31}$, such transmission being effected by the single gear $k$, the gear corresponding to K of Fig. 4 being omitted.

I claim—

1. In a motor-vehicle, a running-gear frame; a traction-wheel-driving-shaft-operating wheel journaled therein; a frame pivoted to the running-gear frame, and a gear-train carried thereby comprising a motor-actuated wheel; the extreme or opposite final gear-wheels of said train having different speeds in different directions of rotation, and being located in position to be respectively enmeshed with the traction-wheel-driving-shaft-operating wheel at opposite limits of the oscillation of the pivoted frame about its pivot.

2. In a motor-vehicle, a running-gear frame; a traction-wheel-driving-shaft-operating wheel; a frame pivoted to the running-gear frame, and a gear-train carried thereby comprising a motor-actuated wheel and extreme or opposite final wheels having opposite directions of rotation and adapted to mesh respectively with the traction-wheel-driving-shaft-operating wheel at the opposite limits of the frame's oscillation about its pivots, and to communicate opposite rotary motion to such wheels.

3. In a motor-vehicle, a running-gear frame; a traction-wheel driving-shaft and a compensating gear-train thereon; the pinion-carrying element of such train being a gear-wheel; a frame pivoted to the running-gear frame, and a gear-train carried thereby comprising a motor-actuated wheel, the extreme or opposite final wheels thereof having opposite directions of rotation and being adapted to mesh with said pinion-carrying wheel of the compensating gear-train at opposite limits of the frame's oscillation about its pivot.

4. In a motor-vehicle, a running-gear frame; a traction-wheel-driving-shaft-operating wheel; a frame pivoted to the running-gear frame, and a gear-train carried thereby, comprising a motor-actuated wheel, the extreme or opposite final wheels thereof being adapted to mesh respectively with the traction-wheel-driving-shaft-operating wheel at opposite limits of the frame's oscillation about its pivots, and to communicate different rotary speed to such wheel; and means for oscillating said pivoted frame at will to either limit of its said oscillating movement.

5. In a motor-vehicle, a running-gear frame; a traction-wheel-driving-shaft-operating wheel journaled therein, having two gear-rims of different diameters; a frame pivoted to the running-gear frame, and a gear-train carried thereby, comprising a motor-actuated wheel, the extreme or opposite final wheels having opposite directions of rotation and being adapted to mesh respectively with the two gear-rims of the traction-wheel-operating wheel at opposite limits of the frame's oscillation about its pivots.

6. In a motor-vehicle, the running-gear frame; a traction-wheel-driving-shaft-operating wheel journaled therein; a gear-train carried thereby, comprising a motor-actuated wheel; the extreme or opposite final wheels of such train having opposite direction of rotation and adapted to mesh respectively with the traction-wheel-driving-shaft-operating wheel at the opposite limits of the frame's oscillation about its pivot; said oscillating frame constituting a housing for the final wheels and intermediate direction-reversing portion of the train.

In testimony whereof I have hereunto set my hand, in the presence of two witnesses, at Chicago, Illinois, this 20th day of November, A. D. 1900.

THOS. B. JEFFERY.

In presence of—
 CHAS. S. BURTON,
 EDGAR L. CONANT.